United States Patent [19]

Matsuyama

[11] Patent Number: 5,228,242
[45] Date of Patent: Jul. 20, 1993

[54] EYEGLASSES FRAME TRACING DEVICE
[75] Inventor: Yoshinori Matsuyama, Gamagori, Japan
[73] Assignee: Nidek Co., Ltd., Aichi, Japan
[21] Appl. No.: 696,482
[22] Filed: May 6, 1991
[30] Foreign Application Priority Data
  Aug. 2, 1990 [JP] Japan ................................. 2-205384
[51] Int. Cl.⁵ .............................................. B24B 9/14
[52] U.S. Cl. ............................... 51/165.74; 51/165.71; 51/101 LG; 51/217 R; 51/284 E
[58] Field of Search .......... 51/217 R, 101 LG, 165 R, 51/165.71, 165.74, 284 E

[56] References Cited
U.S. PATENT DOCUMENTS 4,945,684 8/1990 Wada et al. .................... 51/101 LG
5,121,550 6/1992 Wood et al. .................... 51/101 LG

FOREIGN PATENT DOCUMENTS 3640476 6/1988 Fed. Rep. of Germany ........ 51/101 LG

Primary Examiner—Robert A. Rose
Attorney, Agent, or Firm—Nikaido Marmelstein Murray & Oram

[57] ABSTRACT

An eyeglasses frame tracing device provided in an eyeglass lens polishing machine for the purpose of obtaining processing data needed for fitting lenses into an eyeglasses frame. The device includes a holding device for guiding the eyeglasses frame in the vertical direction to a predetermined position while holding the eyeglasses frame in a sandwiching manner; and a positioning device for guiding the horizontal center of the eyeglasses frame to a predetermined position while applying pressure at the horizontal extremes of the eyeglasses frame towards the center portion thereof.

5 Claims, 14 Drawing Sheets

EYEGLASSES FRAME TRACING DEVICE

BACKGROUND OF THE INVENTION

1. Field of the Invention

The present invention relates to an eyeglasses frame tracing device in an eyeglass lens polishing machine.

2 Description of the Related Art

Conventionally, an eyeglasses frame has been secured in position in an eyeglasses frame tracing device of an eyeglass lens polishing machine by abutting against the frame a frame support, which is adjusted by means of a feeding screw, or by supporting the frame at two points, one in the upper and the other in the lower section thereof, or at three points, two in the upper and one in the lower section thereof.

SUMMARY OF THE INVENTION

In performing the horizontal positional adjustment of the eyeglasses frame, the technician's skill has been relied upon to a large extent. Or, the adjustment has been made by abutting the eyeglasses nose pads against a nose-like object.

It is true that the reference line for vertical adjustment of an eyeglasses frame (a line connecting the average geometrical centers of the right and left lens frame portions) can be located in the above prior arts. However, by using such techniques, it has been impossible to accurately position the horizontal center line of the eyeglasses frame with respect to the tracing device. This is due to the fact that the nose pads of the eyeglasses frame are generally not arranged symmetrically. Thus, one cannot rely upon the accuracy of the horizontal center line of the eyeglasses frame from data obtained by the tracing device. In the process of fitting lenses into the eyeglasses frame, for example, the distance between the average geometrical centers of the right and left lens frame portions is a significant factor. Conventionally, however, there has been no other way of measuring this distance in the frame except with a ruler, resulting in rather inaccurate measurements.

It is an object of this invention to provide an eyeglasses frame tracing device which allows to accurately position the horizontal center line of an eyeglasses frame to the tracing device.

A second object of this invention is to provide an eyeglasses frame tracing device which makes it possible to accurately obtain the distance between the average geometrical centers of the right and left lens frame portions in the eyeglasses frame.

A third object of this invention is to provide an eyeglasses frame tracing device in which specific planes are used for holding an eyeglasses frame therebetween so as to facilitate measurement.

A fourth object of this invention is to provide an eyeglasses frame tracing device in which an eyeglasses frame can be easily secured in position.

In accordance with this invention, the above objects can be achieved by an eyeglasses frame tracing device for obtaining processing data needed for fitting lenses into an eyeglasses frame, the device comprising: a holding device for guiding the eyeglasses frame to a predetermined position in the vertical direction while holding it in a sandwiching manner; and a positioning device for guiding the horizontal center of the eyeglasses frame to a predetermined position while applying pressure at the horizontal extremes of the frame towards the center portion thereof.

Further, in accordance with this invention, the above objects can also be achieved by an eyeglasses frame tracing device for obtaining processing data needed for fitting lenses into an eyeglasses frame, the device comprising: a holding device for guiding an eyeglasses frame to a predetermined position in the vertical direction while holding it in a sandwiching manner; a positioning device for guiding the horizontal center of the eyeglasses frame to a predetermined position while applying pressure at the horizontal extremes of the frame towards the center portion thereof; and a computation device for computing the distance between the average geometrical centers of the right and left lens frame portions.

DETAILED DESCRIPTION OF THE PREFERRED EMBODIMENTS

An embodiment of the present invention will now be described in detail with reference to the accompanying drawings.

(1) General Construction of an Eyeglass Polishing Machine

Figure 1:
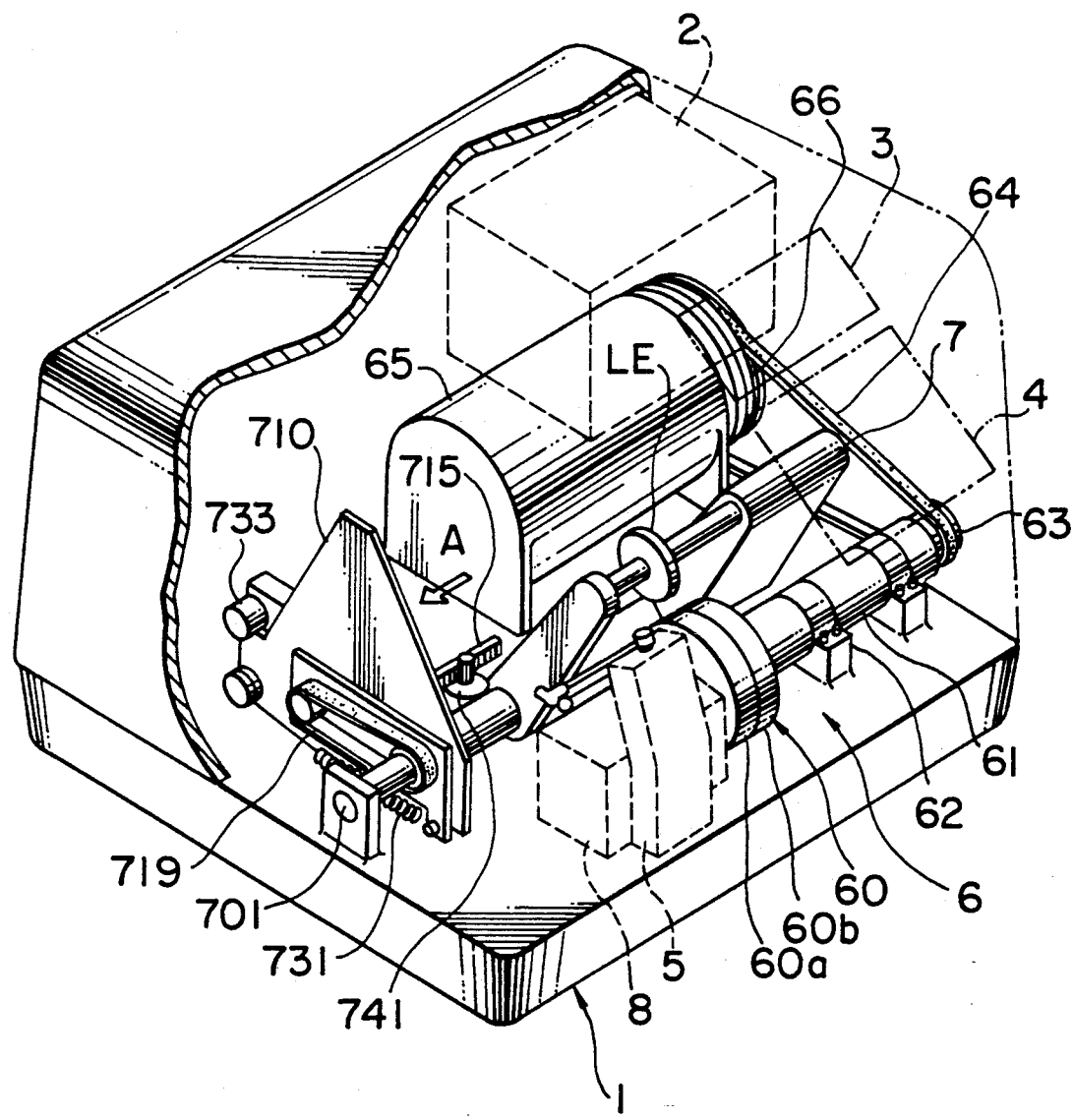
FIG. 1 is a perspective view showing the general construction of a lens polishing machine in accordance with the present invention.

FIG. 1 is a perspective view showing the general construction of an eyeglass polishing machine in accordance with the present invention.

The reference numeral 1 indicates a machine base, on which the components of the lens polishing machine are arranged.

The reference numeral 2 indicates a template configuration measuring device, which is arranged in the upper section of the polishing machine.

Arranged in front of the measuring device 2 are a display section 3, through which measurement results, calculation results, etc. are displayed in the form of characters or graphics, and an input section 4, at which data is entered or commands are given to the device.

Provided in the front section of the polishing machine is a lens configuration measuring device 5 for measuring the imaginary edge thickness, etc. of an unprocessed lens.

The reference numeral 6 indicates a lens polishing section, where an abrasive wheel 60, which is composed of a rough abrasive wheel 60a for glass lenses and a rough abrasive wheel 60b for plastic lenses, is rotatably mounted on a rotating shaft 61, which is attached to the base 1 by means of foxing bands 62.

Attached to one end of the rotating shaft 61 is a pulley 63, which is linked through a belt 64 with a pulley 66 attached to the rotating shaft of an AC motor 65. Accordingly, rotation of the motor 65 causes the abrasive wheel 60 to rotate.

The reference numeral 7 indicates a carriage section, and the reference numeral 700 indicates a carriage.

The reference numeral 8 indicates a V-groove processing section where V-groove processing and flat processing are performed.

(2) Lens Frame Portion and Template Configuration Measuring Section

Tracer Section (a) Construction

The construction of a lens frame portion and template configuration measuring section 2 will be described with reference to FIGS. 2 to 13.

Figure 2:
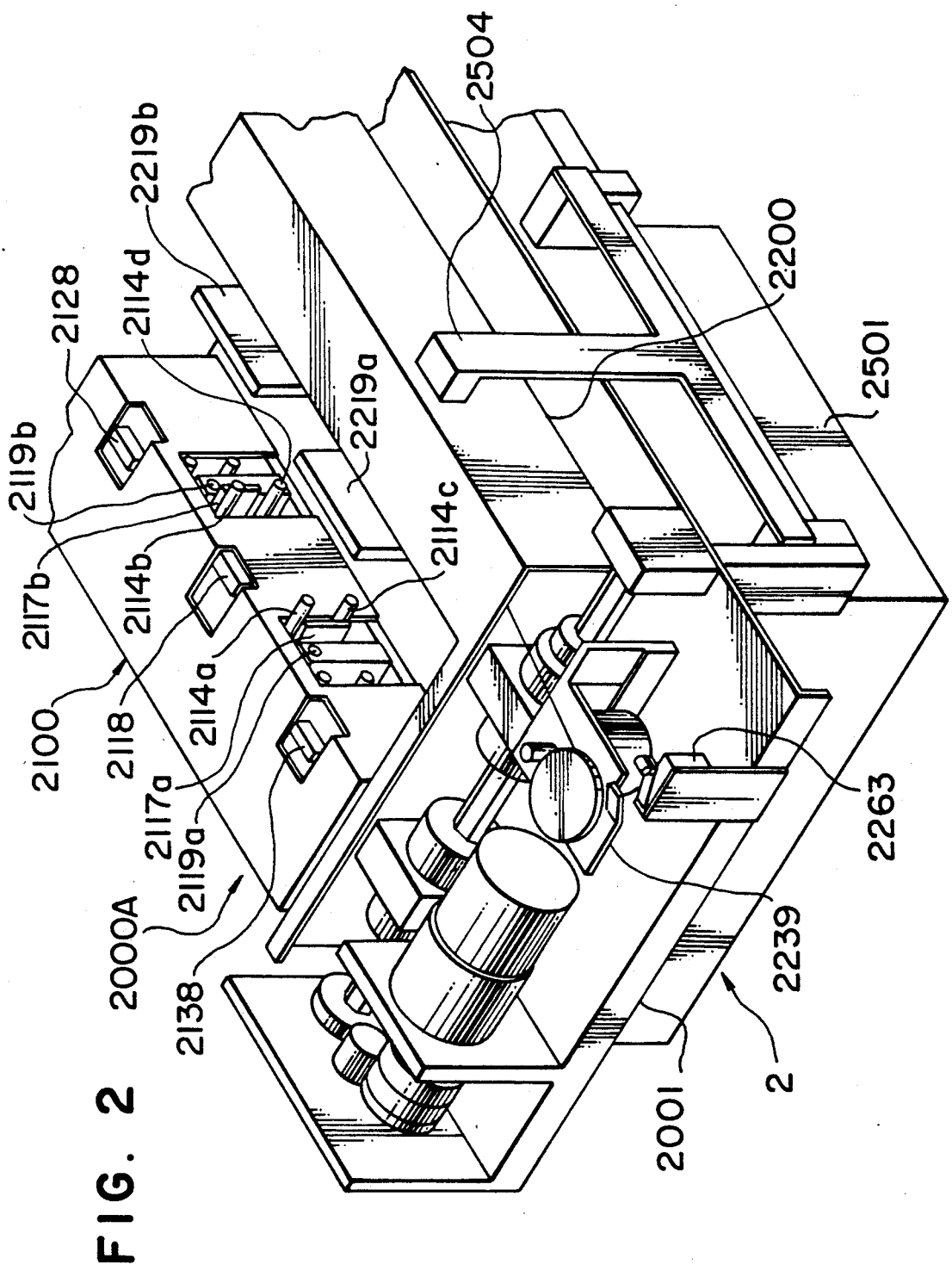
FIG. 2 is a perspective view showing a measurement section for measuring the configurations of lens frame portions and templates.

FIG. 2 is a perspective view showing a lens frame portion and template configuration measuring section in accordance with this embodiment. This section is incorporated in the body of the lens polishing machine and is generally composed of two sections: a frame and template holding section 2000 for holding a frame and templates, and a measurement section 2500 for performing digital measurement of the configurations of lens frame portions in the frame and templates. The frame and template holding section 2000 is further divided into two sections: a frame holding section 2000A and a template holding section 2000B.

Frame Holding Section

FIGS. 3 to 8 show the construction of the frame holding section 2000A.

Figure 3:
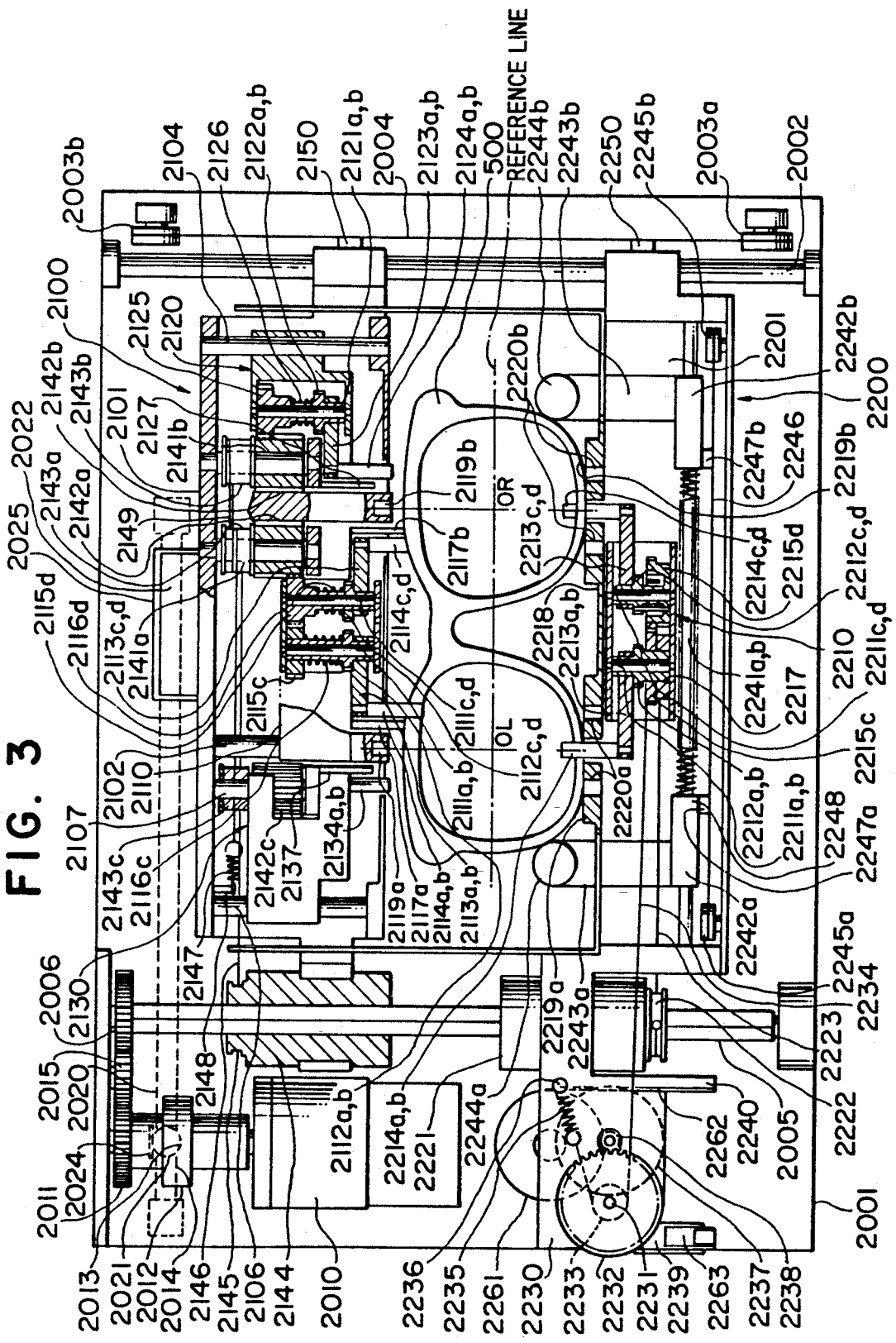
FIG. 3 is a diagram showing a frame holding section 2000A.
Figure 4:
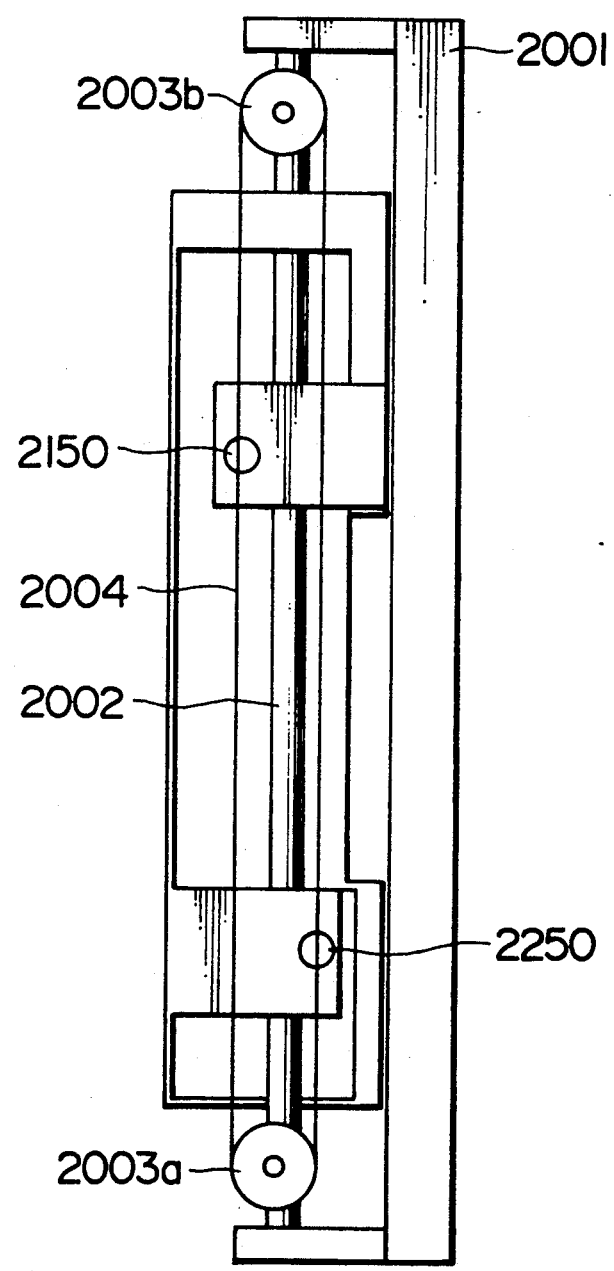
FIG. 4 is a diagram illustrating the operation of a wire 2004.
Figure 5:
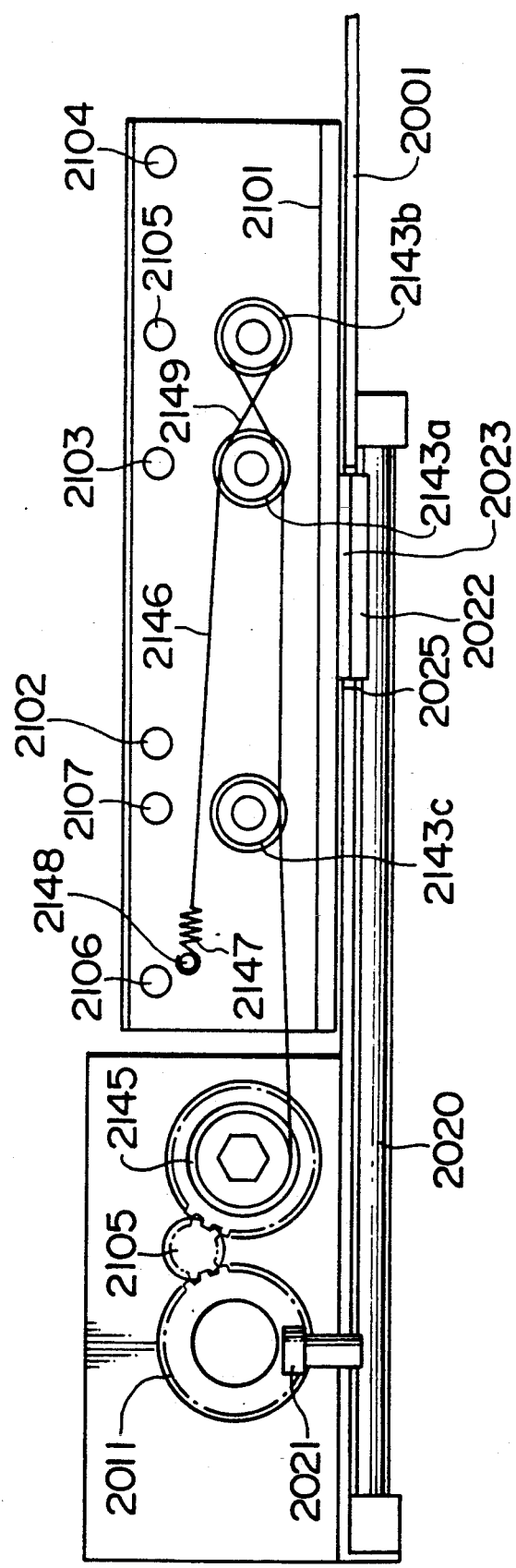
FIG. 5 is a diagram illustrating the operation of wires 2146 and 2149.
Figure 6:
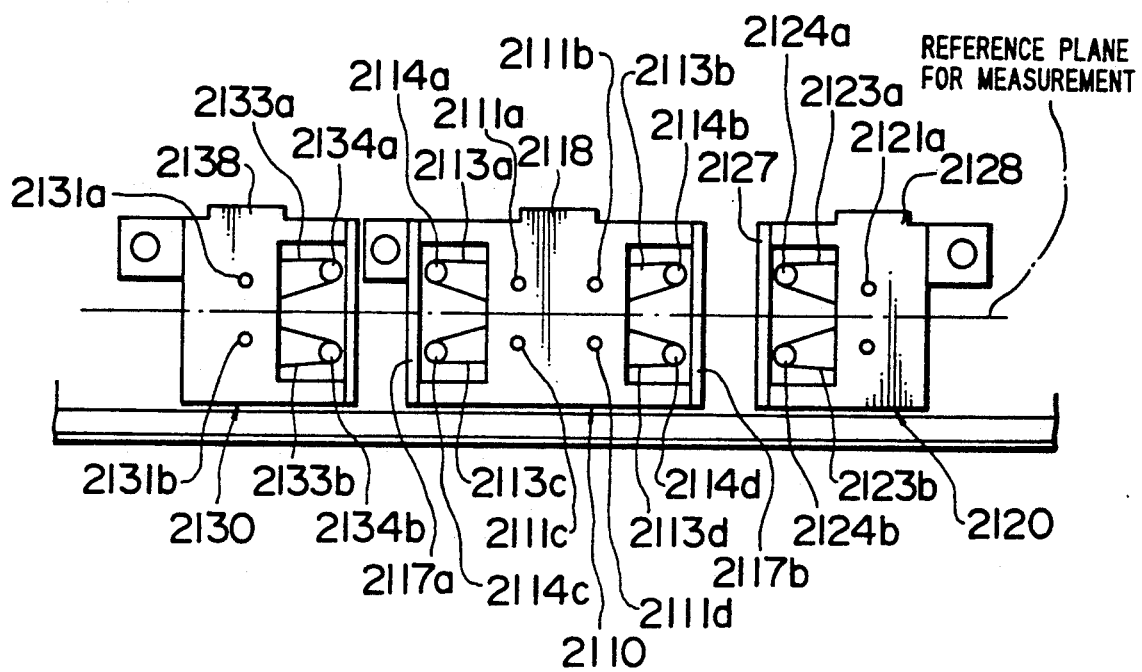
FIG. 6 is a diagram illustrating a fastening mechanism on the side of an upper slider.
Figure 7:
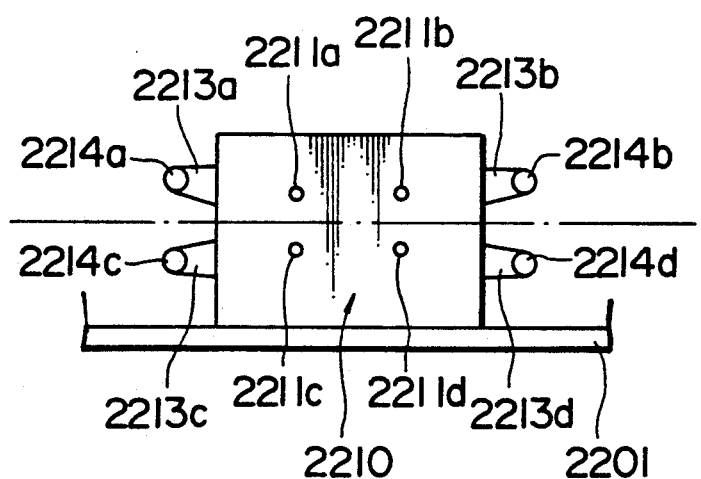
FIG. 7 is a diagram illustrating a fastening mechanism on the side of a lower slider.
Figure 8:
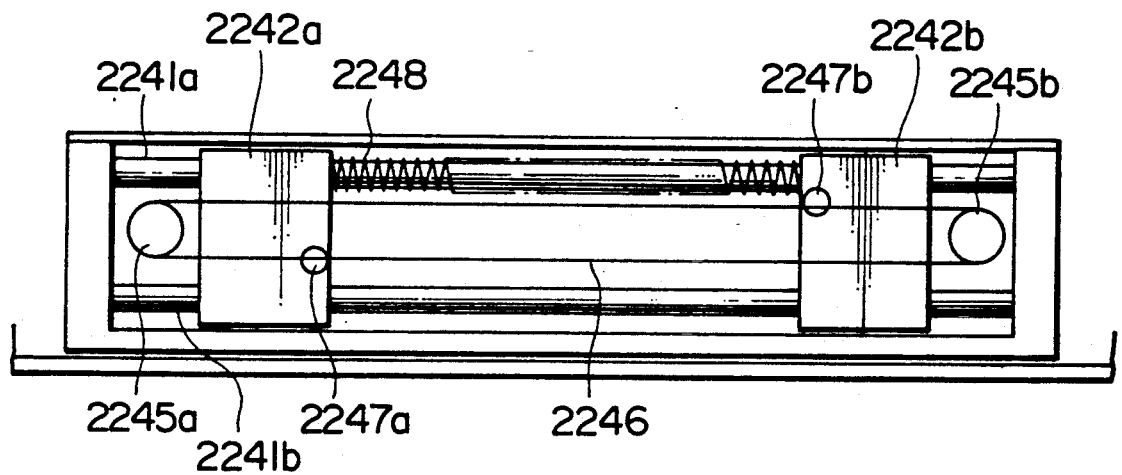
FIG. 8 is a diagram illustrating the operation of a wire 2246.

Referring to FIG. 3, the average geometrical centers of a pair of lens frame portions when the frame is set in the frame holding section 2000A are established as reference points OR and OL, and the straight line connecting these two points is regarded as a reference line. Further, the plane at a certain height as measured from the surface of a box 2001 belonging to the frame holding section 2000A is used as a reference plane for measurement.

An upper slider section 2100 and a lower slider section 2200 are arranged in such a manner as to be slidable along a guide shaft 2002 attached to the box 2001 and a guide rail 2005 having a hexagonal sectional configuration and rotatably supported on the box 2001. The upper section of a wire 2004, which is stretched between pulleys 2003a and 2003b rotatably mounted on the box 2001, is firmly attached to a pin 2150 embedded in the upper slider section 2100, and the lower section of the wire 2004 is firmly attached to a pin 2250 embedded in the lower slider section 2200, enabling these slider sections to make opposite sliding movements symmetrically with respect to the reference line.

A gear 2011 is attached to the rotating shaft of a clamping motor 2010 mounted on the box 2001. This gear 2011 is in mesh with a gear 2006 formed at one end of the guide shaft 2005 through the intermediation of an idle gear 2015, enabling the rotation of the clamping motor 2010 to be transmitted to the guide shaft 2005.

Rotatably supported on the back side of the box 2001 is a shaft 2020, and, by means of a plate spring 2024 attached to the box 2001, a pin 2021 which is embedded in one of the end sections of the shaft 2020 is abutted against a recess 2013 of a cam 2012 formed in the middle section of the gear 2011. Attached to the other end of the shaft 2020 is a brake arm 2022, to which a brake rubber 2023 is attached. This brake rubber 2023 is exposed to the exterior through a hole 2025 of the box 2001.

When the cam 2012 is rotated by the clamping motor 2010, the pin 2021, which has been abutted against the recess 2013, is pressed by a protrusion 2014 of the cam 2012, and the shaft 2020 rotates, with the brake rubber 2023 attached to the brake arm 2022 being abutted against the back surface of the upper slider section 2100.

A top center clamp 2110 is slidably placed on shafts 2102 and 2103 mounted on the base 2101 of the upper slider section 2100. Likewise, a right clamp is slidably placed on shafts 2104 and 2105, and a left clamp 2130 on shafts 2106 and 2107.

Shafts 2111a, 2111b, 2111c and 2111d are rotatably supported by the top center clamp 2110. Rotatably mounted on the shafts 2111a and 2111b are gears 2112a and 2112b, respectively, to which one end of an arm 2113a and one end of an arm 2113b are respectively attached. Clamping pins 2114a and 2114b are respectively attached to the other ends of the arms 2113a and 2113b.

Rotatably mounted on the shafts 2111c and 2111d are gears 2112c and 2112d, to which one end of an arm 2113c and one end of an arm 2113d are respectively attached. Clamping pins 2114c and 2114d are respectively attached to the other ends of the arms 2113c and 2113d.

Further, rotatably attached to the shafts 2111c and 2111d are other gears 2115c and 2115d, which are integrally connected with the gears 2112c and 2112d through the intermediation of torsion coil springs 2116c and 2116d.

In the above arrangement, the gears 2112a, 2112b, and 2115c are in mesh with the gears 2112c, 2112d, and 2115d, respectively. By rotating the gear 2115d, the two pairs of opposed clamp pins: 2114a and 2114c; and 2114b and 2114d, respectively make opposite rotations symmetrically with respect to the reference plane for measurement.

Further, frame supports 2117a and 2117b are respectively attached to each end of the top center clamp 2110, at positions in close proximity to the clamp pin pairs: 2114a and 2114c; and 2114b and 2114d, and perpendicular to the reference plane for measurement. A tab 2118 is provided in the upper portion of the top center clamp 2110.

Respectively arranged on each side of the top center clamp 2110 are holes 2119a and 2119b formed in the base 2101.

Shafts 2121a and 2121b are rotatably supported by the right clamp 2120, and, rotatably mounted on the shaft 2121a is a gear 2122a to which one end of an arm 2123a is firmly attached, and, further, attached to the other end of the arm 2123a is a clamp pin 2124a.

Rotatably mounted on the shaft 2121b is a gear 2122b, to which one end of an arm 2123b is firmly attached, and, attached to the other end of the arm 2123b is a clamp pin 2124b.

Further, rotatably attached to the shaft 2121b is another gear 2125, which is integrally connected with the gear 2122b through the intermediation of a torsion coil spring 2126.

In the above arrangement, the gears 2122a and 2122b are in mesh with each other, and, by rotating the gear 2125, the clamp pins 2224a and 2224b make opposite rotations symmetrically with respect to the reference plane for measurement.

Further, a frame support 2127 is attached to the right clamp 2120, at a position in close proximity to the clamp pins 2124a and 2124b and perpendicular to the reference plane for measurement. A tab 2128 is provided in the upper portion of the right clamp 2120.

Shafts 2131a and 2131b are rotatably supported by the left clamp 2130. Rotatably mounted on the shaft 2131a is a gear 2132a (not shown), to which one end of an arm 2133a is firmly attached, and, attached to the other end of the arm 2133a is a clamp pin 2134a.

Rotatably mounted on the shaft 2131b is a gear 2132b (not shown), to which one end of an arm 2133b is firmly attached, and, attached to the other end of the arm 2133b is a clamp pin 2134b.

Further, rotatably mounted on the shaft 2131b is another gear 2135 (not shown), which is integrally connected with the gear 2132b through the intermediation of a torsion coil spring 2136 (not shown).

In the above arrangement, the gears 2132a and 2132b are in mesh with each other, and, by rotating the gear 2135, the clamp pins 2134a and 2134b make opposite rotations symmetrically with respect to the reference plane for measurement.

Further, a frame support 2137 is attached to the left clamp 2130, at a position in close proximity to the clamp pins 2134a and 2134b and perpendicular to the reference plane for measurement, and a tab 2138 is provided in the upper portion of the left clamp 2130.

A gear 2142a and a pulley 2143a are integrally attached to a shaft 2141a which is rotatably supported by the base 2101 of the upper slider section 2100, with the gear 2142a being in mesh with the gear 2115d. Likewise, gears 2142b and 2142c and pulleys 2143b and 2143c are respectively integrally attached to a shaft 2141b and a shaft 2141c (not shown), with the gears 2142b and 2142c being in mesh with the gears 2125 and 2135, respectively.

Further, the gears 2142a, 2142b, and 2142c are sufficiently long in the axial direction and are capable of being constantly in mesh with the gears 2115d, 2125, and 2135 within the sliding range of the top center clamp 2110, the right clamp 2120, and the left clamp 2130.

A hexagonal shaft hole of a holder 2144, which is rotatably supported by the base 2102 of the upper slider section 2100, is engaged with the guide rail 2005, whereby the holder 2144 is prevented from rotating around the guide rail 2005.

A pulley 2145 is formed on the holder 2144.

A wire 2146 whose one end is firmly attached to the pulley 2145 is passed around pulleys 2143c and 2143a, the other end of the wire 2146 being hooked on a pin 2148, which is embedded in the base 2101, through the intermediation of a spring 2147.

A wire 2149 is stretched between the pulleys 2143a and 2143b in such a manner as to cross each other diagonally.

In the above-described construction of the upper slider section 2100, the rotation of the clamping motor 2010 is transmitted to the guide shaft 2005, and, when the pulley 2145 formed on the holder 2144 rotates, the gears 2142a, 2142b, and 2142c rotate through the wires 2146 and 2149, with all the clamp pin pairs: 2114a and 2114c; 2114b and 2114d; 2124a and 2124b; and 2134a and 2134b making opposite rotations symmetrically with respect to the reference plane for measurement.

Shafts 2211a, 2211b, 2211c, and 2211d are rotatably supported by the lower center clamp 2210, which is attached to the base 2201 of the lower slider section 2200. Rotatably mounted on the shafts 2211a and 2211b are gears 2212a and 2212b, respectably, to which one end of an arm 2213a and one end of an arm 2213b are respectively firmly attached, and clamp pins 2214a and 2214b are attached to the respective other ends of the arms 2213a and 2213b. Rotatably mounted on the shafts 2211c and 2211d are gears 2212c and 2212d, to which one end of an arm 2213c and one end of an arm 2213d are respectively firmly attached, and clamp pins 2214c and 2214d are attached to the respective other ends of the arms 2213c and 2213d.

Further, rotatably mounted on the shafts 2211c and 2211d are other gears 2215c and 2215d, which are integrally connected with the gears 2212c and 2212d through the intermediation of torsion coil springs 2216c and 2216d (not shown).

The torsion coil springs 2116c, 2116d, 2126, 2136, 2216c, and 2216d are provided with a view to protecting the eyeglasses frame from being damaged when it is clamped.

In the above arrangement, the gears 2212a, 2212b, and 2215c are in mesh with the gears 2212c, 2212d, and 2215d, respectively, and, by rotating the gear 2215c, the clamp pin pairs: 2214a and 2214c; and 2214b and 2214d make opposite rotations symmetrically with respect to the reference plane for measurement.

Further, a frame support 2219a having mounting holes 2220a, and a frame support 2219b having mounting holes 2220b, are formed on the base 2201 in such a manner as to be parallel to the reference line.

A hexagonal shaft hole of a holder 2221, which is rotatably supported by the base 2201 of the lower slider section, is engaged with the guide rail 2005, whereby the holder 2221 is prevented from rotating around the guide rail 2005.

A pulley 2222 is formed on the holder 2221.

One end of a wire 2223 is firmly attached to the pulley 2222, with the other end thereof being firmly attached to a pulley 2218 formed on the gear 2215c.

A pulley 2233 is formed in the lower section of a gear 2232, which is rotatably supported by a pin 2231 embedded in an arm 2230 that is formed on the base 2201 of the lower slider section 2200. A wire 2234 whose one end is firmly attached to a pulley 2217 formed on the gear 2212a is wound around a pulley 2233, with the other end of the wire 2234 being hooked on a pin 2236, which is embedded in the arm 2230, through the intermediation of a spring 2235.

Further, attached to the arm 2230 is a potentiometer 2237, to the rotating shaft of which is firmly attached a gear 2238.

This gear 2238 is in mesh with the gear 2232 and is capable of transmitting the moving amount of the clamp pin 2214a to the potentiometer 2237 through the wire 2234.

Attached to the base 2201 of the lower slider section 2200 are shafts 2241a and 2241b, on which are slidably placed a left slider 2242a and a right slider 2242b.

A left frame pressing member 2244a having a cylindrical configuration is attached to the tip end of an arm 2243a extending from the left slider 2242a, in such a position as to be perpendicular to the reference plane for measurement, and, likewise, a right frame pressing member 2244b having a cylindrical configuration is attached to the tip end of an arm 2243b extending from the right slider 2242b, in such a position as to be perpendicular to the reference plane for measurement.

The lower section of a wire 2246 stretched between pulleys 2245a and 2245b, which are rotatably mounted on the base 2201, is firmly attached to a pin 2247a embedded in the left slider 2242a, and the upper section of the wire 2246 is firmly attached to a pin 2247b embedded in the right slider 2242b, whereby opposite sliding movement can be made symmetrically with respect to the center line connecting the points OR and OL. The two ends of a spring 2248 are respectively firmly attached to the left and right sliders 2242a and 2242b, whereby these sliders are constantly pulled towards the center.

While in this embodiment the left and right sliders 2242a and 2242b are constantly pulled towards the center by the spring 2248, this structure should not be construed as restrictive.

For example, the positional adjustment of the left and right sliders 2242a and 2242b may also be effected by driving the pulleys 2245a and 2245b by a motor (not shown).

Rotatably supported by the box 2001 is a drum 2261, around which a constant torque spring 2262 is wound. One end of this constant torque spring 2262 is firmly attached to an arm 2240 formed on the base 2201 of the lower slider section 2200, whereby the upper and lower sliders 2100 and 2200 are constantly biased towards the center.

Template Holding Section

Figure 9:
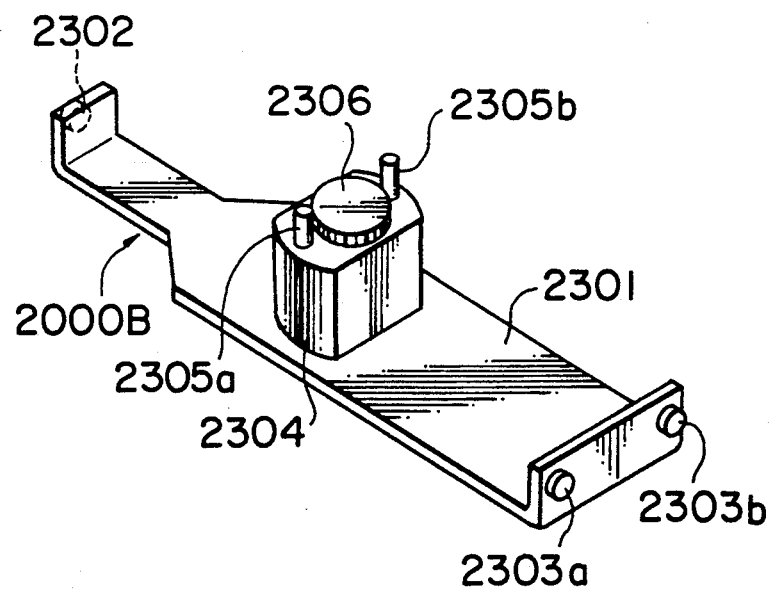
FIG. 9 is a perspective view showing the structure of a template holding section 2000B.

FIG. 9 shows the construction of the template holding section 2000B.

The template holding section 2000B includes a mounting plate 2301 having bent sections its ends, in which pins 2302, 2303a, and 2303b are embedded, with a template holder 2304 being firmly attached to approximately the center of the mounting plate 2301.

Embedded in the template holder 2304 are pins 2305a and 2305b, which are engaged with holes formed in a template, which is fastened to the template holder 2304 by means of a fastening screw 2306.

When the pin 2302 of the mounting plate 2301 having a template fastened thereto is inserted into the hole 2119a of the upper slider section 2100, and the pins 2303a and 2303b of this mounting plate 2301 are inserted into the hole 2220a formed in the frame support 2210a of the lower slider section 2200, the mounting plate is secured between the upper and lower slider sections 2100 and 2200. In this condition, the center of the template holder 2304 is positioned at the point OL.

When the mounting plate 2301 has been secured between the upper and lower slider sections 2100 and 2200, a cambered section 2239 formed on the arm 2230 of the lower slider section 2200 abuts against a microswitch 2263 attached to the box 2001, thereby enabling the fastening of the template to be confirmed.

Likewise, when the pin 2302 of the mounting plate 2301 having a template fastened thereto is inserted into the hole 2119b of the upper slider section 2100 and the pins 2303a and 2303b of this mounting plate 2301 are inserted into the hole 2220 formed in the frame support 2219b of the lower slider section 2200, the mounting plate is secured between the upper and lower slider sections 2100 and 2200. In this condition, the center of the template holder 2304 is positioned at the point OR.

Measurement Section

Figure 10:
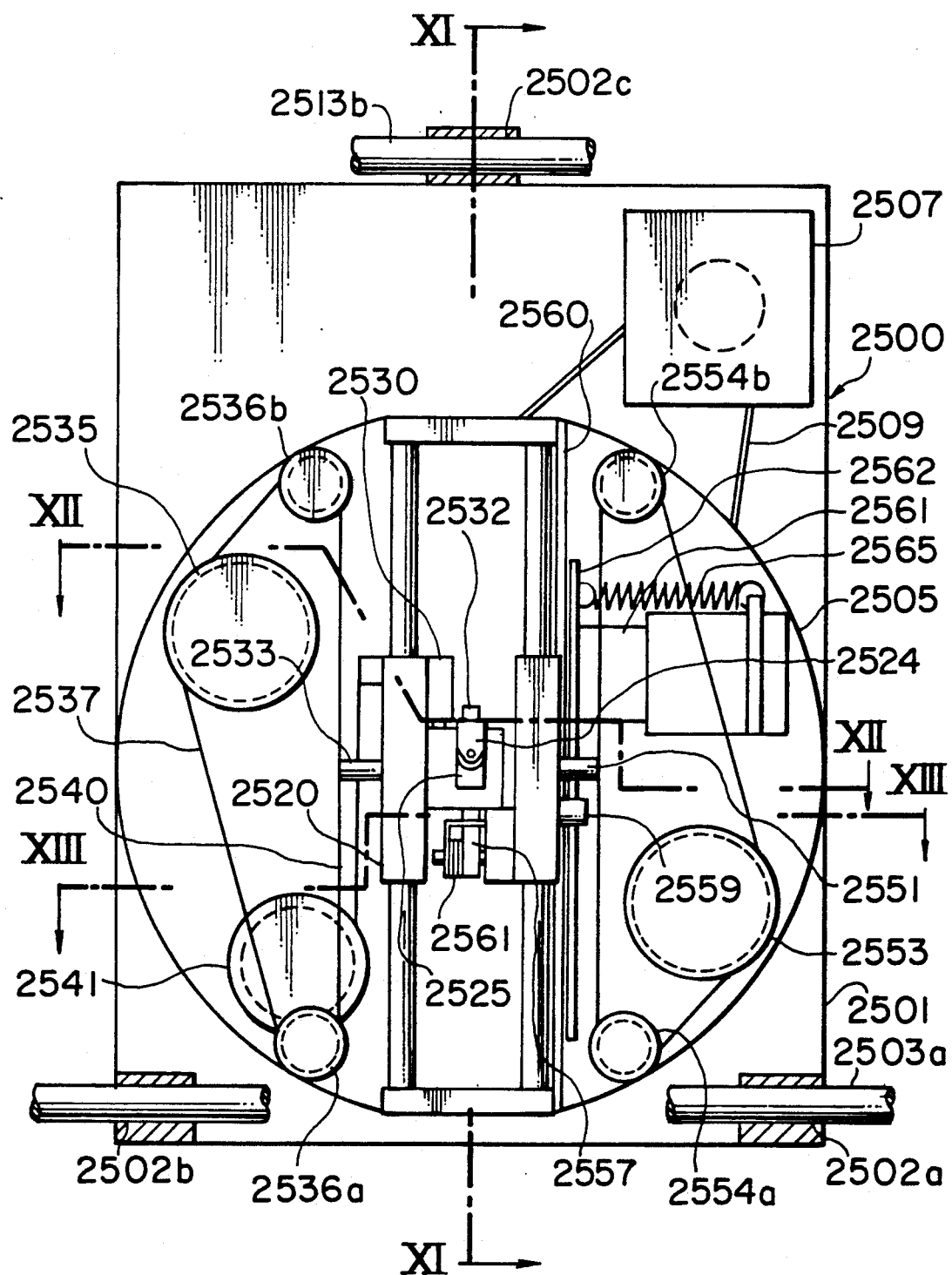
FIG. 10 is a plan view of the measurement section.
Figure 11:
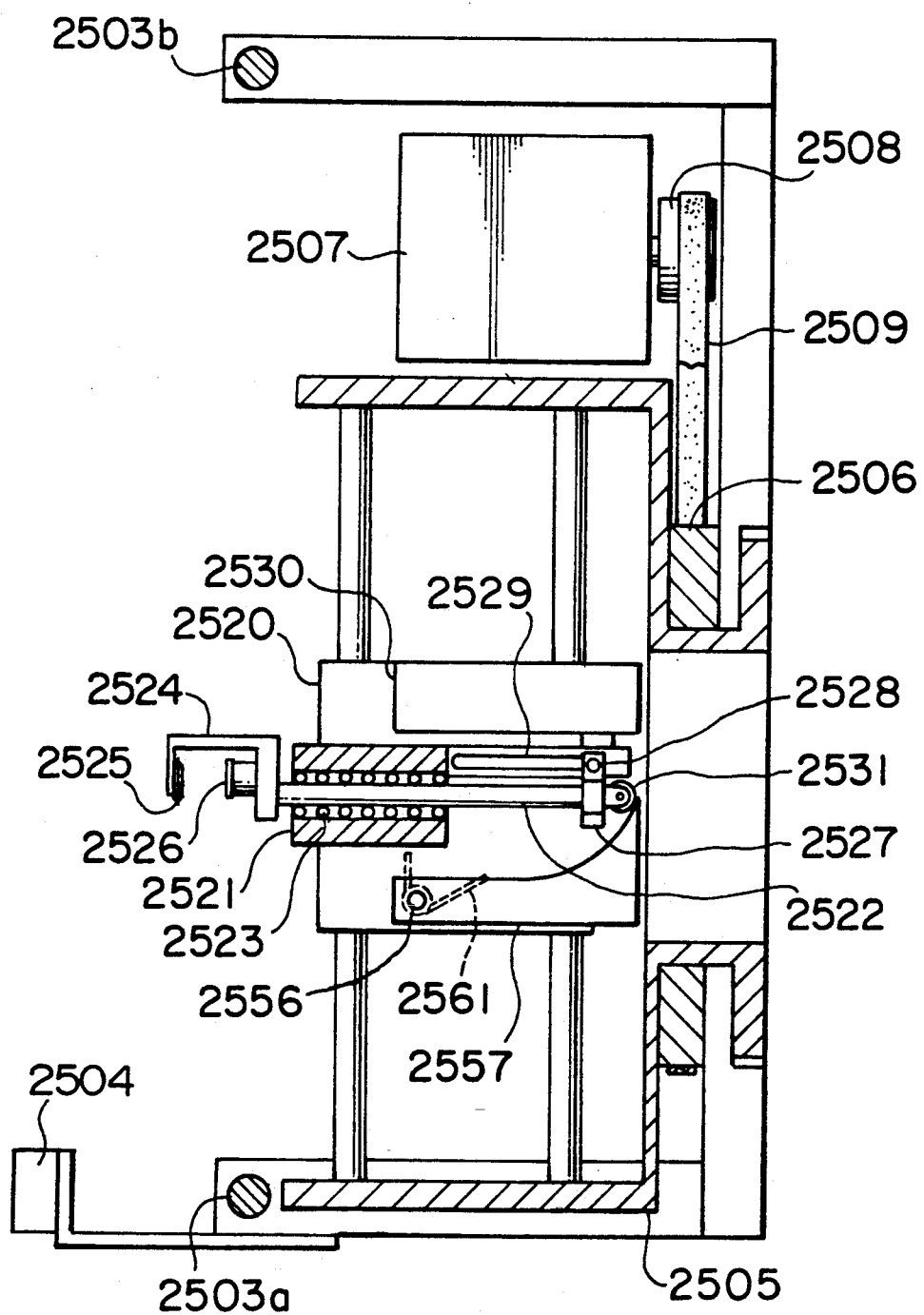
FIG. 11 is a sectional view taken along the line XI—XI of FIG. 10.

Next, the construction of the measurement section 2500 will be described with reference FIGS. 10 to 13. FIG. 10 is a plan view of the measurement section, and FIGS. 11, 12, and 13 are sectional views taken along the lines XI—XI, XII—XII, and XIII—XIII, respectively, of FIG. 10.

A movable base 2501 has shaft holes 2502a, 2502b, and 2502c and is slidably supported by shafts 2503a and 2503b attached to the box 2001. Further, embedded in the movable base 2501 is a lever 2504, by means of which the movable base 2501 can be slid, thereby bringing the rotational center of a rotating base 2505 to the positions OR and OL on the frame holding section 2300. The rotating base 2505, on which a pulley 2506 is formed, is rotatably supported by the movable base 2501. Stretched between the pulley 2506 and a pulley 2508, which is attached to the rotating shaft of a pulse motor 2507 mounted on the movable base 2501, is a belt 2509, by means of which the rotation of the pulse motor 2507 is transmitted to the rotating base 2505.

Figure 12:
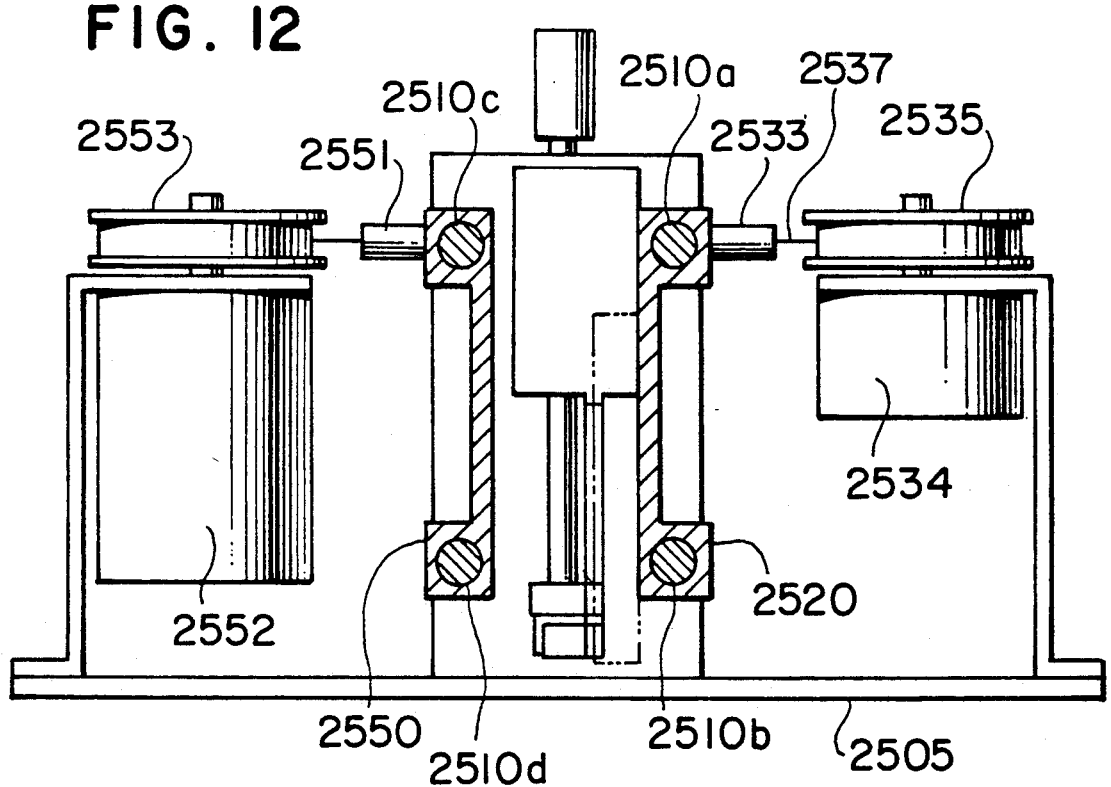
FIG. 12 is a sectional view taken along the line XII—XII of FIG. 10.
Figure 13:
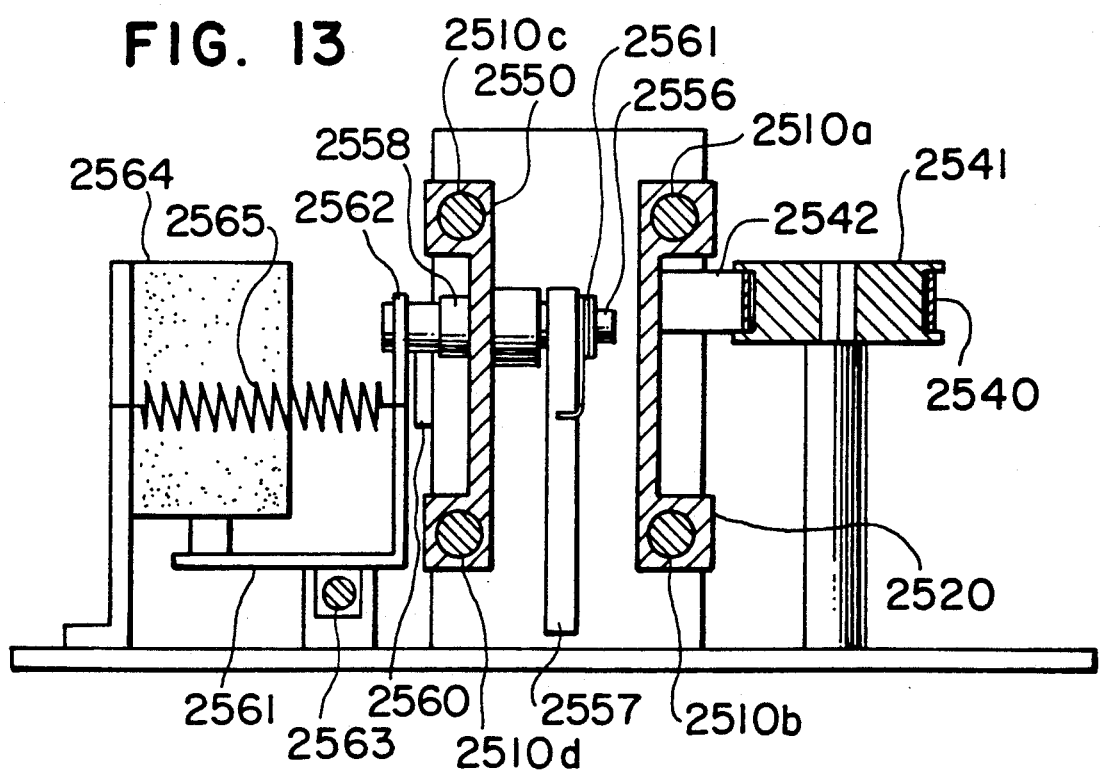
FIG. 13 is a sectional view taken along the line XIII—XIII of FIG. 10.

As shown in FIG. 12, four rails 2510a, 2510b, 2510c, and 2510d are attached to the rotating base 2505. A gauge head section 2520 is slidably mounted on the rails 2510a and 2510b. Formed in this gauge head section 2520 is a vertical shaft hole 2521, into which a gauge head shaft 2522 is inserted.

A ball bearing 2523 is provided between the gauge head shaft 2522 and the shaft hole 2521, whereby the vertical movement and the rotation of the gauge head shaft 2522 are smoothed. Attached to the upper end of the gauge head shaft 2522 is an arm 2524, and, rotatably supported by the upper section of this arm 2524 is an abacus-bead-like V-gauge head 2525 adapted to abut against the V-shaped groove of the lens frame portions.

While in this embodiment an abacus-bead-like V-gauge head 2525 is rotatably supported, this should not be construed as restrictive. The V-gauge head 2525 may also be unrotatable, and, as long as its tip section is formed abacus-bead like, its configuration need not be disc-like.

A cylindrical template measurement roller 2526 which is adapted to abut against the edge of a template is rotatably supported by the lower section of the arm 2524. The outer peripheral surfaces of the V-gauge head 2525 and the template measurement roller 2526 are located in the center line of the gauge head shaft 2522.

In a position below the gauge head shaft 2522, a pin 2528 is embedded in a ring 2527 which is rotatably mounted on the gauge head shaft 2522, with the movement in the rotating direction of this pin 2528 being limited by an elongated hole 2529 formed in the gauge head section 2520. Attached to the tip end of the pin 2528 is the movable section of a potentiometer 2530, the moving amount in the vertical direction of the gauge head shaft 2522 being detected by means of this potentiometer 2530.

A roller 2531 is rotatably supported by the lower end section of the gauge head section 2522.

A pin 2533 is embedded in the gauge head section 2520, and a pulley 2535 is attached to the shaft of a potentiometer 2534 which is attached to the rotating base 2505. Pulleys 2536a and 2536b are rotatably supported by the rotating base 2505, and a wire 2537 which is firmly attached to the pin 2533 is stretched between these pulleys 2536a and 2536b and is wound around the pulley 2535. Thus, the moving amount of the gauge head section 2520 is detected by the potentiometer 2534.

Further, a constant torque spring 2540 which is adapted to constantly pull the gauge head section 2520 toward the side of tip of the arm 2524 is attached to a drum 2541 which is rotatably supported by the rotating base 2505, one end of the constant torque spring 2540 being firmly attached to a pin 2542 embedded in the gauge head section 2520.

Slidably mounted on the rails 2510c and 2510d on the rotating base 2505 is a gauge head driving section 2550, in which a pin 2551 is embedded, and a pulley 2553 is attached to the rotating shaft of a motor 2552 attached to the rotating base 2505. Pulleys 2554a and 2554b are rotatably supported by the rotating base 2505, and a wire 2555 firmly attached to a pin 2551 is stretched between these pulleys 2554a and 2554b and is wound around the pulley 2553, whereby the rotation of the motor 2552 is transmitted to the gauge head driving section 2550.

The gauge head driving section 2550 abuts against the gauge head section 2520, which is pulled towards the gauge head driving section 2550 by the constant torque spring 2540, and, by moving the gauge head driving section 2550, the gauge head section 2520 can be moved to a predetermined position.

Further, rotatably supported by the gauge head driving section 2550 is a shaft 2556, one end of which has an arm 2557 abutting against the roller 2531 that is rotatably supported by the lower end section of the gauge head section 2522, and the other end of which is attached an arm 2558 rotatably supporting a roller 2559. One end of a torsion coil spring 2561 is hooked on the arm 2557 in such a manner that the roller 2559 comes to abut against a stationary guide plate 2560 which is firmly attached to the rotating base 2505, and the other end of this torsion coil spring 2561 is firmly attached to the gauge head section 2550, so that, when the gauge head driving section 2550 moves, the roller 2559 moves in the vertical direction along the guide plate 2560.

The vertical movement of the roller 2559 causes the shaft 2556 to rotate, and the arm 2557 firmly attached to the shaft 2556 also rotates round the shaft 2556, causing the gauge head section 2522 to move in the vertical direction rotatably mounted on the rotating base 2505 is a shaft 2563, to which a movable guide plate 2561 is firmly attached. One end of the sliding shaft of a solenoid 2564 mounted on the rotating base 2505 is attached to a movable guide plate 2562. One end of a spring 2565 is hooked on the rotating base 2505, and the other end thereof is hooked on the movable guide plate 2562, normally pulling the guide plate 2562 to a position where its guide section does not abut against the roller 2559. When a solenoid 2564 operates to pull up the movable guide plate 2562, the guide section of this movable guide plate 2562 moves to a position where it is parallel to the stationary guide plate 2560, allowing the roller 2559 to abut against the guide section and move along the guide plate 2562.

(b) Operation

Next, the operation of the above-described lens frame portion and template configuration measurement device 2 will be described with reference to FIGS. 2 to 18.

Measurement of Lens Frame Portion Configuration

First, the operation of measuring an eyeglasses frame will be described.

Either the left or the right lens frame portion of the eyeglasses frame 500 is selected for measurement, and the measurement section 2500 is moved to the measurement side by means of a lever 2504 which is firmly attached to the movable base 2501.

The frame holding section of the present device is capable of horizontal holding and one lens frame portion holding of the frame. In the following, the horizontal holding operation will be described.

By pulling the tab 2118 formed on the top center clamp 2110 of the upper slider section 2100 and inwardly pushing the tabs 2128 and 2138 of the right and left clamps 2120 and 2130, only the frame supports 2117a and 2117b and the clamp pins 2114a, 2114b, 2114c, and 2114d of the top center clamp 2110 are set ready for use, whereas the frame support 2127 and the clamp pins 2124a and 2124b of the right clamp 2120 and the frame support 2137 and the clamp pins 2134a and 2134b of the left clamp 2130 remain lodged inside. In this condition, the opening degree of the clamp pins is maximum.

Next, the right and left frame pressing members 2244a and 2244b are moved away from each other, and, at the same time, the lower slider section 2200 is pulled so as to enlarge the distance between the upper and lower slider sections to a sufficient degree. The front sections of the eyeglasses frame is positioned between the clamp pin pairs: 2114a and 2114c; and 2114b and 2114d of the upper slider section 2100, and are abutted against the frame supports 2117a and 2117b. Then, the distance between the upper and lower slider sections 2100 and 2200 is diminished, positioning the lower frame sections between the clamp pairs: 2214a and 2214c; and 2214b and 2214d, of the lower slider section 2200, abutting them against the frame supports 2219a and 2219b. Afterwards, the distance between the right and left frame pressing members 2244a and 2244b is reduced, abutting them against the sides of the eyeglasses frame.

In this embodiment, the constant torque spring 2262 and the spring 2248 are constantly exerting a centripetal force on the upper and lower slider sections 2100 and 2200 and the left and right frame pressing members 2244a and 2244b, and, by holding the eyeglasses frame by the upper and lower slider sections 2100 and 2200 and the left and right frame pressing members 2244a and 2244b, the horizontal center of the frame can be retained at the middle point between the points OR and OL.

When a tracing switch in the input section 4 described below is depressed with the frame set as described above, the brake rubber 2023 comes to abut against the back surface of the upper slider section 2100 due to the action of the clamping motor 2010, with the lower slider section 2200 being secured in position through the upper slider section 2100 and the wire 2004. Afterwards, the clamp pin pairs: 2114a and 2114c; and 2114b and 2114d, of the upper slider section 2100, and the clamp pin pairs: 2214a and 2214c; and 2214b and 2214d of the lower slider section 2200, are closed and abut against the frame. Further, when the clamping motor 2010 rotates, the clamp pin pairs: 2114a and 2114c; 2114b and 2114d; 2214a and 2214c; and 2214b and 2214d, are strongly pressed against the frame due to the action of the torsion coil springs 2116c, 2116d, 2216c, and 2216d, thereby securing the frame in position.

In the case of one lens frame portion holding, for example, right lens frame portion holding, the center clamp 2110 and the right clamp 2120 of the upper slider section 2100 are pulled out, securing the right side of the frame in position by means of the clamp pins 2114b and 2114d of the top center clamp 2110, the clamp pins 2124a and 2124b of the right clamp 2120, and the clamp pins 2214b and 2214d of the lower center clamp 2210 of the lower slider 2200. In the case of left lens frame portion holding, the left clamp 2130 is used.

Figure 14:
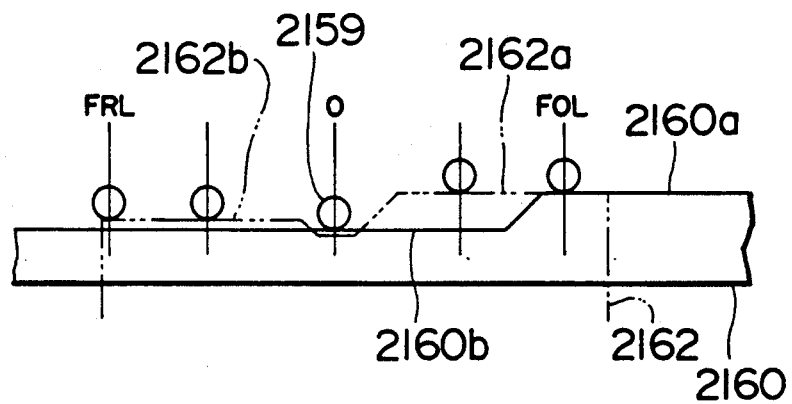
FIGS. 14 and 15 are diagrams illustrating the vertical movement of a gauge head.
Figure 15:
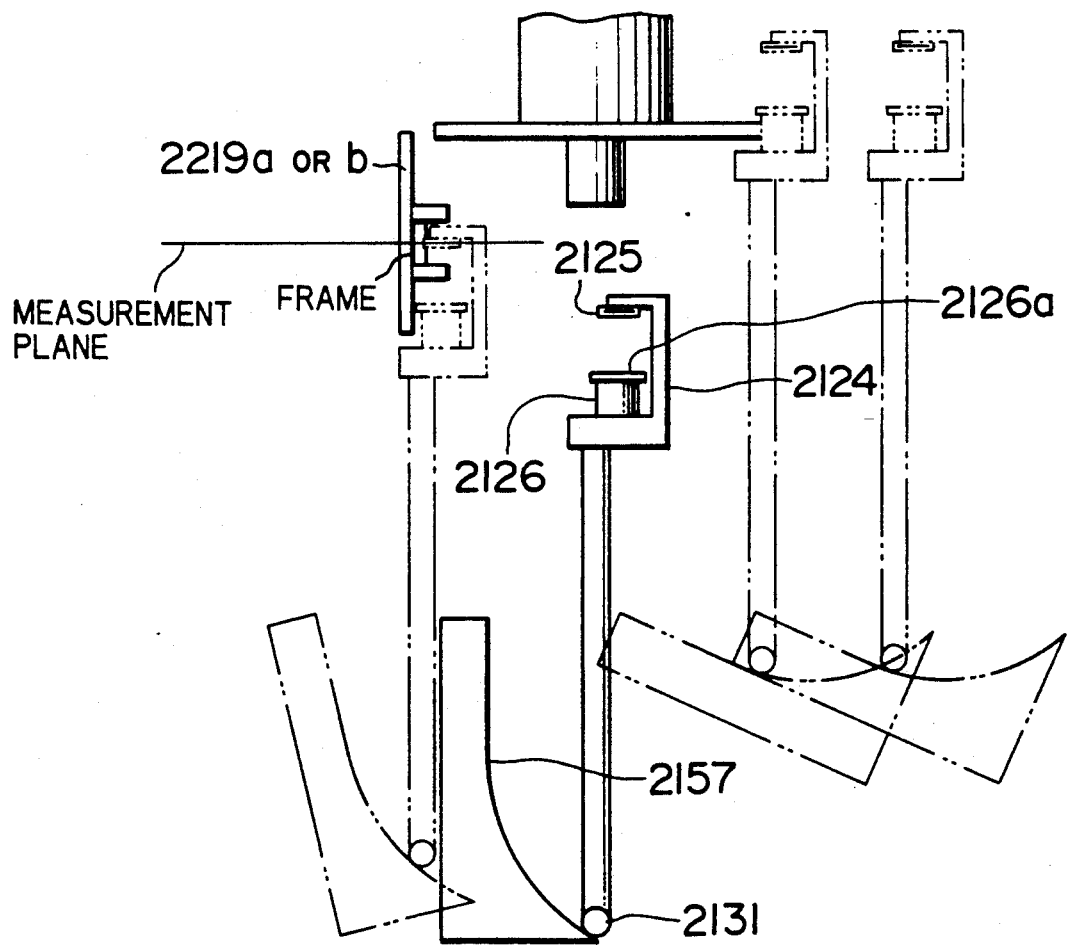

In FIGS. 14 and 15, the roller 2559 of the gauge head driving section 2550 is at the reference position O, the pulse motor 2507 being rotated a predetermined angle so as to swing the rotating base 2505 in such a manner that the moving direction of the gague head driving section 2550 becomes perpendicular to the reference line.

Subsequently, the guide section of the movable guide plate 2562 is moved to a predetermined position by the solenoid 2564, and the gauge head driving section 2550 is moved in the direction of the lower slider 2200. This causes the roller 2559 to move from the guide section 2560a of the stationary guide plate 2560 to the movable guide plate 2562b, and the gauge head shaft 2522 is raised by the arm 2557, with the V-gauge head 2525 being retained at the level of the reference plane for measurement.

Further, when the gauge head driving section 2550 is moved, the V-gauge head 2525 is inserted into the V-groove of the lens frame portion, and the gauge head section 2520 stops its movement, the gauge head driving section 2550 moving to FRL to stop there.

Subsequently, the pulse motor 2507 is rotated each time by a unit rotation pulse number which has previously been set. At this time, the gauge head section 2520 moves along the guide shaft 2510a and 2510b in accordance with the radius vector of the lens frame portion, the amount of this movement being read by the potentiometer 2534. The gauge head shaft 2522 moves up and down following the curve of the lens frame portion, the amount of this movement being read by the potentiometer 2530. From the rotation angle θ of the pulse motor 2507, the read amount r of the potentiometer 2534, and the read amount z of the potentiometer 2530, the lens frame portion configuration is measured as (rn, θn, zn) (n=1, 2, ..., N). This measurement data (rn, θn, zn) (n=1, 2, ..., N) is subjected to polar-orthogonal coordinate transformation, and, from arbitrary four points (x1, y1, z1), (x2, y2, z2), (x3, y3, z3), and (x4, y4, z4) of the data (xn, yn, zn) thus obtained, the frame curve and the frame curve center (xF, yF, zF) are obtained (using the same formula as that for obtaining the lens curve).

Figure 16:
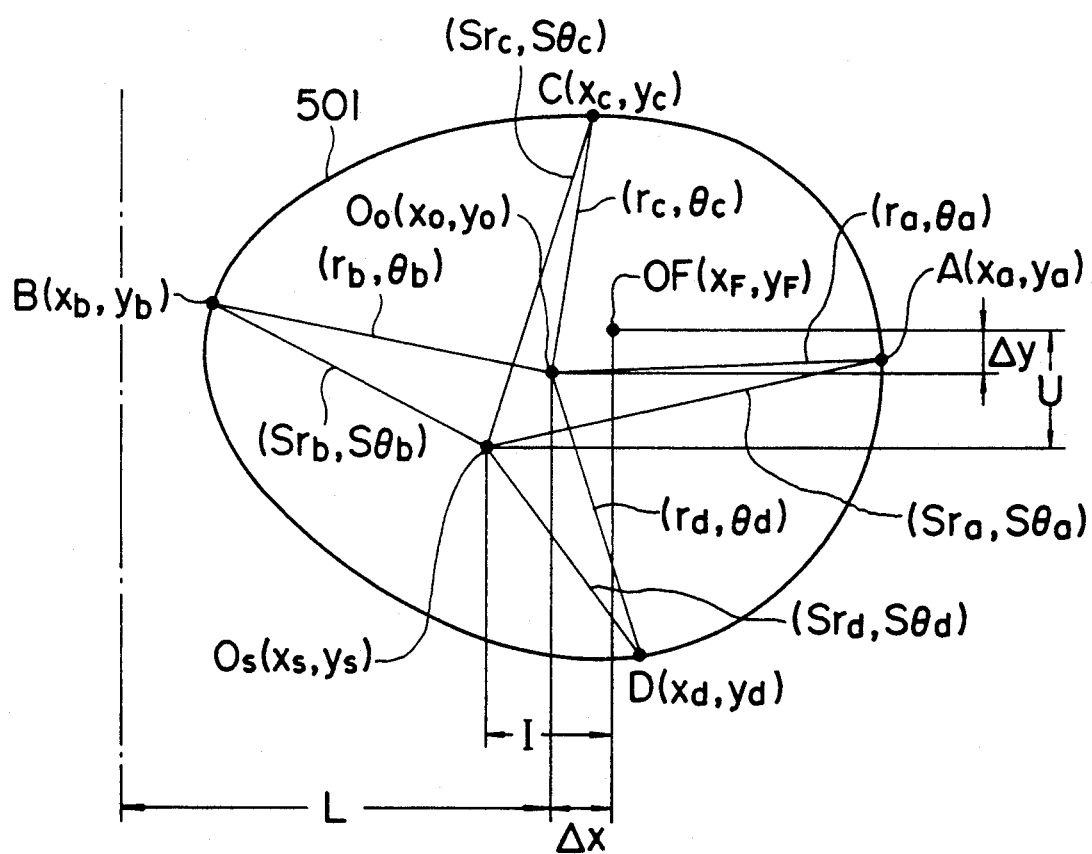
FIG. 16 is a diagram illustrating a coordinate transformation.

Further, referring to FIG. 16, selected from among the x and y components (xn, yn) of (xn, yn, zn) are a measurement point A (xa, ya) having the maximum value in the X-axis direction, a measurement point B (xb, yb) having the minimum value in the X-axis direction, a measurement point C (xc, yc) having the maximum value in the Y-axis direction, and a measurement point D (xd, yd) having the minimum value in the Y-axis direction, and, the geometrical center OF (xF, yF) of the lens frame portion is obtained as:

$$(xF, yF) = \left( \frac{xa + xb}{2}, \frac{yc + yd}{2} \right) \quad (1)$$

From the distance L between the known frame center and the rotational center O0 (x0, y0) of the gauge head section 2120 and the deviation amount ($\Delta x$, $\Delta y$) between O0 and OF, ½ of the distance FPD between the geometrical centers of the lens frame portions is obtained as:

$$FPD/2 = (L - \Delta x) = \{L - (xF - X0)\} \quad (2)$$

While in the above-described method FPD is obtained by coinciding the frame center with the device center, it is also possible to obtain FPD by using another frame holding device.

Figure 17:
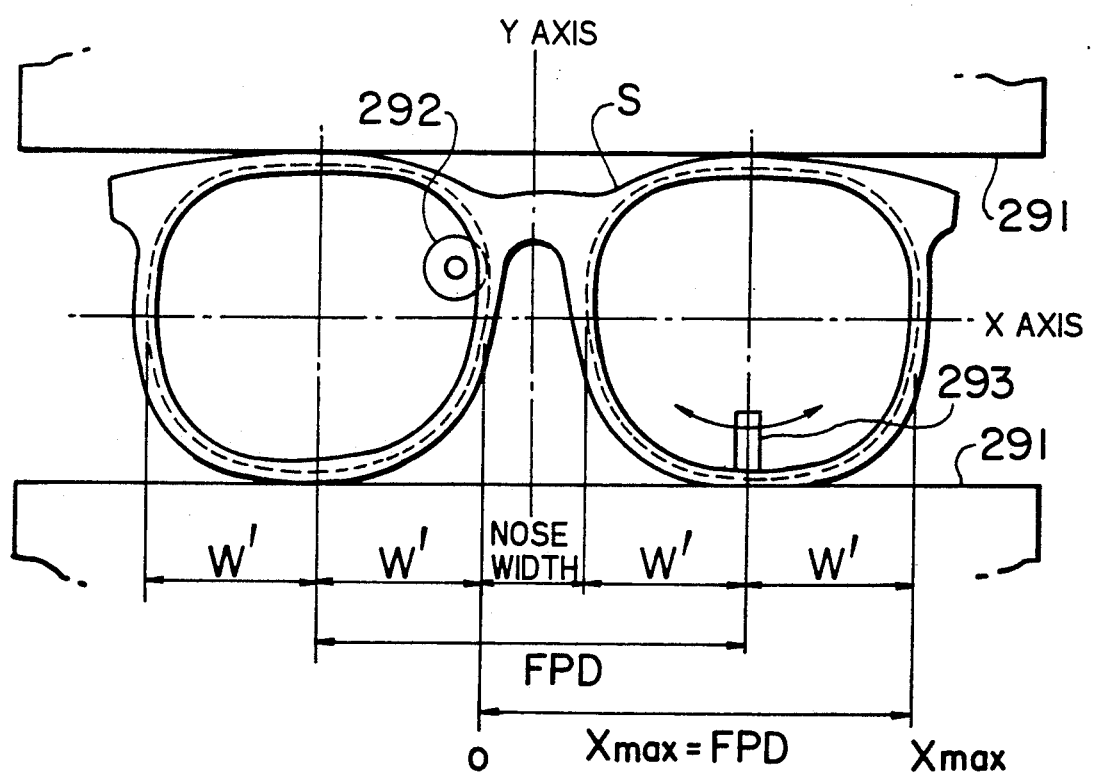
FIG. 17 is a diagram illustrating another method of obtaining the distance between geometrical centers of the eyeglasses frame.

In FIG. 17, the reference symbol S indicates eyeglasses, and the reference numeral 291 indicates frame holders adapted to make opposite sliding movements, holding the eyeglasses S therebetween. The reference numerals 292 and 293 respectively indicate a positioning pin and a stylus of the measurement section.

To obtain FPD in a boxing system, that groove bottom section of the lens frame portion not to be traced which is on the side of the nose is abutted against the positioning pin 292, which is capable of moving in the Y-axis direction and the Z-axis direction (i.e., the direction which is perpendicular to the plane of the drawing), biasing the eyeglasses S in such a manner that the positioning pin 292 abuts against that groove bottom section which is nearest to the nose. Then, while holding the frame by means of the frame holders 291 adapted to slide opposite to each other, the lens frame portion configuration (xn, yn, zn) (n=1, 2, ..., N) is measured by the above-mentioned measurement section.

The distance between the position O of the positioning pin not varying in the X-axis direction and the position where the xn is maximum, can be obtained as FPD.

It is also possible to obtain FPD by abutting the positioning pin 292 against the lens frame portion nearest to the temple and obtaining the minimum value of xn. Further, the positioning pin 292 is not restricted to the type used in this embodiment. Any type of positioning pin that is capable of restriction in the X-axis direction, for example, the stylus of another measurement section, will serve the purpose. Further, instead of biasing the eyeglasses S, the positioning pin 292 may be moved in the X-axis direction.

Further, FPD can also be obtained by tracing the right and left lens frame portions alternately or simultaneously.

Next, from the inter-pupil distance PD designated at the input section 4 to be described below, the inner adjustment amount Il is obtained as:

$$I1 = \frac{FPD}{2} - \frac{PD}{2} \quad (3)$$
$$= \{L - (xF - x0) - PD/2\}$$

Further, on the basis of a preset upper adjustment amount U1, the position OS (xS, yS), where the optical center of the eyeglass lens to be processed should be located, is obtained as follows:

$$OS(xS, yS) = (xF + I1, yF + U1) \quad (4)$$
$$= \left\{ \frac{xa + xb}{2} + L - (xF - x0) - \frac{PD}{2}, \frac{xc + yd}{2} + U1 \right\}$$

From this OS, processing data (Srn, S$\theta$n) (n=1, 2, ..., N) is obtained through transformation into polar coordinates having OS as the center, and the lens edge thickness is measured by means of an unprocessed lens configuration measuring section 5, obtaining the V-groove curve and the V-groove position.

Figure 18:
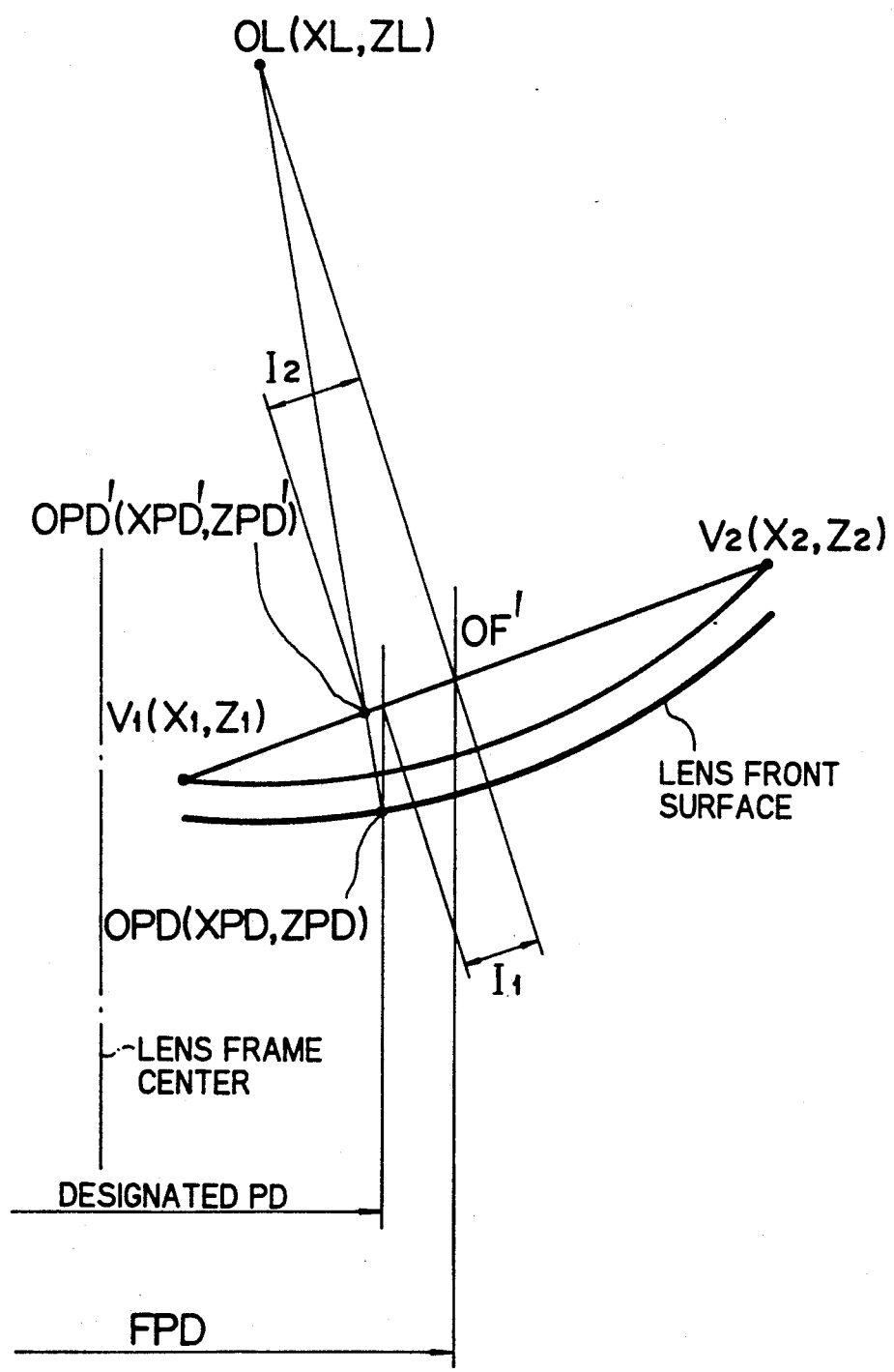
FIG. 18 is a diagram illustrating an adjustment amount computing method.

The adjustment amount in the X-axis direction will be explained with reference to FIG. 18. Suppose, in a section in the X-axis direction, the V-groove apex positions are V1(x1, z1) and V2(x2, z2) and the middle point therebetween is OF'. Further, suppose the central position of the front curved surface of the lens when fitted into the lens frame portion is OL (xL, zL) and its radius rL.

From the value in the X-axis direction of the designated PD position, xPD, and the equation expressing the front surface curve $(x-xL)^2+(z-zL)^2=rL^2$, the value in the Z-axis direction of the designated PD position, zPD, is obtained. The point of intersection of the straight line connecting the center OL (xL, zL) of the front surface curve and the PD position in the lens front surface, OPD (xPD, zPD), and the straight line connecting the V-groove apexes V1(x1, z1) and V2(x2, z2), is obtained as OPD'(xPD', zPD'), and the distance between the points OF' and OPD' is obtained as the actual adjustment amount in the X-axis direction, I2.

Likewise, the adjustment amount in the Y-axis direction, I2, is obtained, and, on the basis of I2 and U2, the position where the optical center of the lens to be processed should be located, OS'(xS', yS'), is obtained. From this OS', processing data (Srn', S$\theta$n') (n=1, 2, ..., N) is obtained through transformation of (xn, yn) into polar coordinates having OS' as the center, obtaining the V-groove curve and the V-groove position again.

While in this embodiment the PD value correction is effected on the basis of the lens configuration measured by obtaining the frame curve and the center thereof, this method of correction should not be construed as restrictive. The correction could be effected in a simple manner by, for example, varying the PD value in proportion to the measured FPD value and, further, taking into account the lens configuration.

In the device of this embodiment, the configuration measurement can be performed on each of the right and left lens frame portions, or, alternatively, it may be performed on only one of them, applying inverted data to the other one.

In the frame curve CF, the angle defined by the straight line connecting the frame curve center (xF, yF, zF) and the point (xn, yn, zn) (n=1, 2, ..., N) and the straight line connecting the frame curve center (xF, yF, zF) and the position of the optical center OS', is obtained as a frame groove angle v$\theta$n (n=1, 2, ..., N).

Template Configuration Measurement

Next, the template measurement operation will be described.

The pins 2305a and 2305b embedded in the template holder 2304 which is firmly attached to substantially the middle section of the mounting plate 2301 are engaged with holes formed in a template, which is fastened to the template holder 2304 by means of the fastening screw 2306.

It is determined on which side the template should be attached, and, by means of the lever 2504 firmly attached to the movable base 2501, the measurement section 2500 is moved to the side where the measurement is to be performed.

In the case where the template is attached on the left side, the pin 2302 of the mounting plate 2301 to which the template is fastened is inserted into the hole 2119a of the upper slider section 2100, and the pins 2303a and 2303b are inserted into the hole 2220a formed in the frame support 2219a of the lower slider section 2200, thereby securing the template in position between the upper and lower sliders 2100 and 2200. In this condition, the center of the template holder 2304 is at the point OL and coincides with the rotational center of the gauge head section 2520, so that the geometrical center of the template coincides with the rotational center of the gauge head section 2520. In the case where the template is attached on the right side, the holes 2119b and 2220a are utilized to secure the template in position between the upper and lower sliders 2100 and 2200.

When the tracing switch of the input section 4 described below is depressed, with the template set as described above, the gauge head driving section 2550 remains at the reference position 0, and the rotating base 2505 rotates to the position where the moving direction of the gauge head driving section 2550 and the straight line connecting the points OR and OL coincide with each other.

When the gauge head driving section 2550 moves in the direction opposite to that in frame measurement, the roller 2559 moves from the guide section 2560b to the guide section 2560a, of the stationary guide plate 2560, and the gauge head shaft 2522 is raised by the arm 2557, retaining the flange section 2526a of the template measurement roller 2526 at a level which is higher by a certain amount than the upper surface of the template.

After the gauge head driving section 2550 has been moved to OL, the movable guide plate 2562 is moved to a predetermined position by the solenoid 2564, bringing the measurement head driving section 2550 back to the reference position O. At this time, the guide section 2560a of the stationary guide plate 2560 is at the same level as the guide section 2562a of the movable guide plate 2562, so that the template measurement roller 2526 moves until it comes to abut against the template while keeping a certain level.

Subsequently, the pulse motor 2507 is rotated each time by a unit rotation pulse number which has previously been set. At this time, the gauge head section 2520 moves along the guide shafts 2510a and template, the amount of this movement being read by the potentiometer 2534.

From the rotation angle $\theta$ of the pulse motor 2507 and the read amount r of the potentiometer 2534, the template configuration is measured as (rn, $\theta$n) (n=1, 2, ..., N).

This measurement data is subjected to polar-orthogonal coordinate transformation, and, selected from the data (xn, yn) thus obtained are a measurement point A (xa, ya) having the maximum value in the X-axis direction, a measurement point B (xb, yb) having the minimum value in the X-axis direction, a measurement point C (xc, yc) having the maximum value in the Y-axis direction, and a measurement point D (xd, yd) having the minimum value in the Y-axis direction. The geometrical center OF (xF, yF) of the lens frame portion is obtained as follows:

$$(xF, yF) = \left( \frac{xa + xb}{2}, \frac{yc + yd}{2} \right) \quad (1)'$$

From the distance L between the known frame center and the rotational center O0 (x0, y0) of the gauge head section 2120 and the deviation amount ($\Delta$x, $\Delta$y) between O0 and OF, ½ of the distance FPD between the geometrical centers of the lens frame portions is obtained as:

$$FPD/2 = (L - \Delta x) = \{L - (xF - X0)\} \quad (2)'$$

Next, from the inter-pupil distance PD designated at the input section 4 to be described below, the inner adjustment amount I is obtained as:

$$\begin{aligned} I1 &= FPD/2 - PD/2 \\ &= \{L - (xF - x0) - PD/2\} \end{aligned} \quad (3)'$$

Further, on the basis of a preset upper adjustment amount U, the position where the optical center of the eyeglass lens to be processed should be located, the point OS (xS, yS), is obtained as follows:

$$\begin{aligned} OS(xS, yS) &= (xF + I, yF + U) \\ &= \left\{ \frac{xa + xb}{2} + L - (xF - x0) - \frac{PD}{2}, \frac{xc + yd}{2} + U \right\} \end{aligned} \quad (4)'$$

From this OS, processing data (Srn, S$\theta$n) (n=1, 2, ..., N) is obtained through transformation of (xn, yn) into polar coordinates having OS as the center, and the lens edge thickness is measured by the unprocessed lens configuration measuring section 4, obtaining the V-groove curve and the V-groove position.

With the eyeglasses frame tracing device of the eyeglass lens polisher of this invention, the eyeglasses frame can be secured in position with ease and accuracy when performing the tracing thereof, thus attaining an improvement in operational efficiency.

What is claimed is:

1. An eyeglasses frame tracing device for obtaining processing data needed for fitting lenses into an eyeglasses frame, comprising:
   a holding means for guiding a vertical center line of the eyeglasses frame in to a predetermined position while holding the eyeglasses frame in a sandwiching manner, said holding means includes a plurality of sandwiching means, each of said sandwiching means having a pair of pins adapted to move symmetrically with respect to said vertical center line; and
   a positioning means for guiding a horizontal center line of the eyeglasses frame to another predetermined position while applying pressure at the horizontal extremes of the eyeglasses frame towards the center portion thereof.

2. An eyeglasses frame tracing device as claimed in claim 1, wherein said sandwiching means operate in synchronism by a switching operation, retaining the eyeglasses frame on a same plane.

3. An eyeglasses frame tracing device for obtaining processing data needed for fitting lenses into an eyeglasses frame, comprising:
   a holding means for guiding a vertical center line of the eyeglasses frame to a predetermined position while holding the eyeglasses frame in a sandwiching manner, said holding means moving symmetrically with respect to said vertical center line;
   positioning means for guiding a horizontal center line of the eyeglasses frame to another predetermined position, said positioning means having right and left frame pressing members which move symmetrically with respect to said horizontal center line; and
   computation means for computing a distance between geometrical centers of right and left lens frame portions from horizontal data of a measurement instrument.

4. An eyeglasses frame tracing device for obtaining processing data needed for fitting lenses into an eyeglasses frame, comprising:
   a holding means for guiding a vertical center line of the eyeglasses frame to a predetermined position while holding moving symmetrically with respect to said vertical center line; and
   positioning means for guiding a horizontal center line of the eyeglasses frame to another predetermined position, said positioning means having right and left frame pressing members which move symmetrically with respect to said horizontal center line.

5. An eyeglasses frame tracing device as claimed in claim 4, wherein said holding means includes sandwiching means which operate in synchronism by a switching operation, retaining the eyeglasses frame on a same plane.

* * * * *

UNITED STATES PATENT AND TRADEMARK OFFICE
CERTIFICATE OF CORRECTION

PATENT NO. : 5,228,242
DATED : July 20, 1993
INVENTOR(S) : MATSUYAMA

It is certified that error appears in the above-indentified patent and that said Letters Patent is hereby corrected as shown below:

Column 3, lines 29 and 30, after "V-groove processing section" insert --(i.e., commonly known as bevel processing section)--.

Column 3, line 30, after "V-groove processing" insert -- (i.e., commonly known as bevel processing) --.

Column 13, lines 23 and 24, after "V-groove curve" insert -- (i.e., commonly known as bevel curve) --.

Column 13, line 24, after "V-groove position" insert -- (i.e., commonly known as bevel position) --.

Column 13, line 27, after "V-groove apex positions" insert -- (i.e., commonly known as bevel apex positions) --.

UNITED STATES PATENT AND TRADEMARK OFFICE
CERTIFICATE OF CORRECTION

PATENT NO. : 5,228,242
DATED : July 20, 1993
INVENTOR(S) : MATSUYAMA

It is certified that error appears in the above-indentified patent and that said Letters Patent is hereby corrected as shown below:

Column 13, line 41, after "V-groove apexes" insert -- (i.e., commonly known as bevel apexes) --.

Column 13, line 52, after "V-groove curve" insert -- (i.e., commonly known as bevel curve) -- and after "V-groove position" insert -- (i.e., commonly known as bevel position) --.

Column 15, lines 55 and 56 after "V-groove curve" insert -- (i.e., commonly known as bevel curve) -- and after "V-groove position" insert -- (i.e., commonly known as bevel position) --.

Signed and Sealed this

Twenty-second Day of October, 1996

Attest:

BRUCE LEHMAN

Attesting Officer
Commissioner of Patents and Trademarks